United States Patent

[11] 3,630,366

| [72] | Inventor | Robert H. Joost<br>Oconomowoc, Wis. |
|---|---|---|
| [21] | Appl. No. | 872,609 |
| [22] | Filed | Oct. 30, 1969 |
| [45] | Patented | Dec. 28, 1971 |
| [73] | Assignee | Environmental Pollution Control Co., Inc.<br>Oconomowoc, Wis. |

[54] ROTATING BIOLOGICAL WASTE TREATMENT SYSTEM
10 Claims, 4 Drawing Figs.

[52] U.S. Cl. .................................................. 210/150,
210/252
[51] Int. Cl. .................................................. C02c 1/02
[50] Field of Search .......................................... 210/17,
150, 151, 252; 261/92

[56] References Cited
FOREIGN PATENTS
| 930,226 | 7/1963 | Great Britain ............... | 210/150 |
| 935,162 | 8/1963 | Great Britain ............... | 210/17 |

*Primary Examiner*—Frank A. Spear, Jr.
*Attorney*—Zarley, McKee & Thomte

ABSTRACT: A rotary disc waste treatment unit having a semicylindrical tank into which liquid waste material is fed. An axial sleeve shaft has end plugs to which end plates are threadably bolted and which in turn carry stub shafts received in bearing supports on opposite sides of the tank. A plurality of radially extending channel members are provided with inner and outer bolt means extending through the channel members, end plates, styrofoam discs and alternately disposed styrofoam ring spacers; the inner ends of the channel members engaging the end plates while the outer ends are in mating contact with the outer styrofoam discs. A series of rotary disc units may be secured together with weirs in between to control the flow of fluid from one waste unit to the next and all of the rotary disc units may be driven by a common motor at a low rate of speed to give maximum exposure of the waste material on the discs to the atmosphere. The styrofoam disc and spacer rings are sufficiently buoyant to offset the weight of the rotary disc units and minimize the power requirements.

INVENTOR
ROBERT H. JOOST
BY
Zarley, McKee & Thomte
ATTORNEYS

ROTATING BIOLOGICAL WASTE TREATMENT SYSTEM

The rotating disc waste treatment units of this invention are suitable for use in the rotating biological surface waste treatment process. The rotating biological surface waste treatment process is a superior waste treatment process when compared to the trickling filter and activated sludge processes.

The rotating disc waste treatment unit is a biological reactor and includes a series of closely spaced vertical discs mounted on a horizontally driven shaft. The shaft is supported by bearings and is slowly rotated by power driven equipment. The rotating shaft alternately dips the disc surfaces into the waste material and then into the air. Waste material continuously flows parallel to the discs. The waste level is slightly less than half the disc diameter. Intimate contact between the waste material and disc surfaces is provided by contoured tank bottoms.

As the rotating disc units are operated, a biomass is quickly established on the disc surface. These colonies of bacteria will continue to propogate in the presence of adequate oxygen and food material on both sides of the discs. The growth produced is a uniform mass which smoothly covers the entire disc surface. The rotating biological surface waste treatment process does not require seeding to establish the biological growth, providing the waste material is biodegradeable and has adequate nutrients. The biomass on the discs oxidizes the waste material into metabolic byproducts and excess cell material. The treated water containing these solids is directed to a secondary clarifier for separation.

The wet surface, renewable waste film, on the biomass removes the oxygen from the air after rising from the waste material. The thin waste film on the surface is extremely rich in oxygen and contributes to the high organic and oxygen uptake of the biomass. The oxygen-rich film penetrates the biomass through mixing and diffusion into its innermost colonies.

The retention time or volume of waste material retained in the rotating biological surface waste treatment process is very short. The closely spaced discs and contoured tank bottom insure intimate and very fast contact between the waste material and the biomass growth. As an example, using domestic waste treatability and concentrations, the retention time is less than 45 minutes to achieve a 90 percent $BOD_5$ reduction in the system.

The oxygen-rich renewable waste film provides the environment to support high densities of aerobic bacteria. It has been found that the bacterial density on the discs is between 18,000 and 30,000 p.p.m. active organisms. If the micro-organisms were hypothetically removed from the discs and placed in the mixed liquor (volume of waste material in the contoured tank) of the system the resulting volatile suspended solids concentration would be approximately 17,000 p.p.m. The large number of active organisms enables the process to absorb organic shock loads. Using a conventional term in biological processes, food to micro-organism ratio, F/M, instantaneous values of 0.02 to 0.05 are obtained. In the conventional activated sludge process, this value is 0.3. The high density of the aerobic biomass also makes this process ideally suited for treating high strength wastes.

The abundant biomass is grown on the disc surfaces and tenaciously adheres to the surfaces despite the turbulence and agitation caused by the rotation. Consequently, in times of hydraulic overload, the biomass is not "washed out" of the system. The system under adverse conditions such as high hydraulic or continuously high organic overloads, will continue to remove a fixed amount of waste material. This is in deference to the trickling filter or activated sludge plants that become inoperative because of nonaerobic conditions caused by overloads.

The discs used in the rotary disc waste treatment units are molded of low density expandable polystyrene material. They have a buoyancy of 60 lb. per cu. ft. Consequently, the entire downward load is offset by the buoyancy of the discs. The only power required to rotate the unit is the power to overcome bearing friction and transmission efficiencies. This process should not be expected to consume one-half the power required by the conventional activated sludge process.

There are minimal distribution problems in the system since the waste material entering the contoured tank is quickly dispersed. This is accomplished by both the mixing action of the rotating discs and the dispersion in the fluid. As additional safeguards to maintain good distribution, strategically located weirs, V-notch or submerged orifice restrictions, may be located at the inlet and outlet of each stage. These arrangements are extremely low head loss measures which will not interfere with the gravity flow arrangement of the waste material.

The physical configuration of the rotating biological waste treatment systems lends itself extremely well to process staging. It is very desirable to use this process technique to obtain high treatment efficiencies while achieving economic benefits.

Additional benefits and alternative solutions are available upon study of the physical characteristic and process variations of the rotating biological surface waste treatment process. This process is a mechanical, biological waste treatment process using chemical engineering process techniques. The beneficial arrangement of supporting biological population on rotating disc surfaces relieves the designer of one extremely cumbersome problem. This problem is designing and arranging a biological waste treatment process around a complex oxygen-dependent micro-organism relationship. The rotating biological surfaces insure the presence of high oxygen transfer surfaces at all times. This, in effect, lets the designer select other criteria of the system to determine the final arrangement.

The rotating disc waste treatment units may be arranged in series or parallel packages. The number of discs per stage, and consequently the hydraulic and/or organic loading capacity, may be varied both in the initial installation or, in some cases, when new conditions are encountered, they can be changed in the field.

These and other features and advantages of this invention will become readily apparent to those skilled in the art upon reference to the following description when taken into consideration with the accompanying drawings, wherein.

Figure 1:
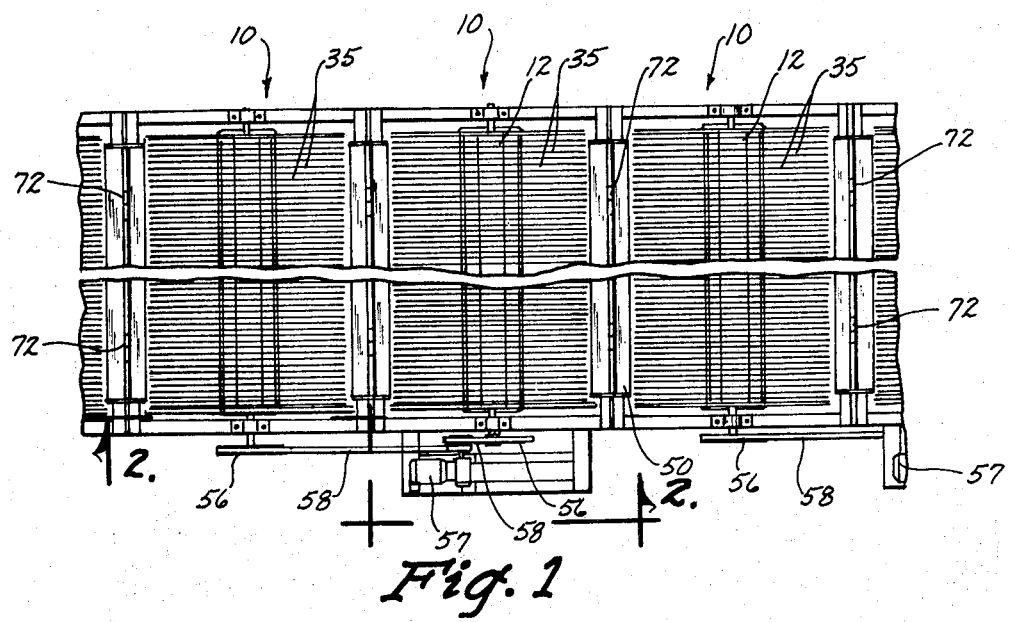
FIG. 1 is a fragmentary top plan view of a series of rotary disc waste treatment units.
Figure 3:
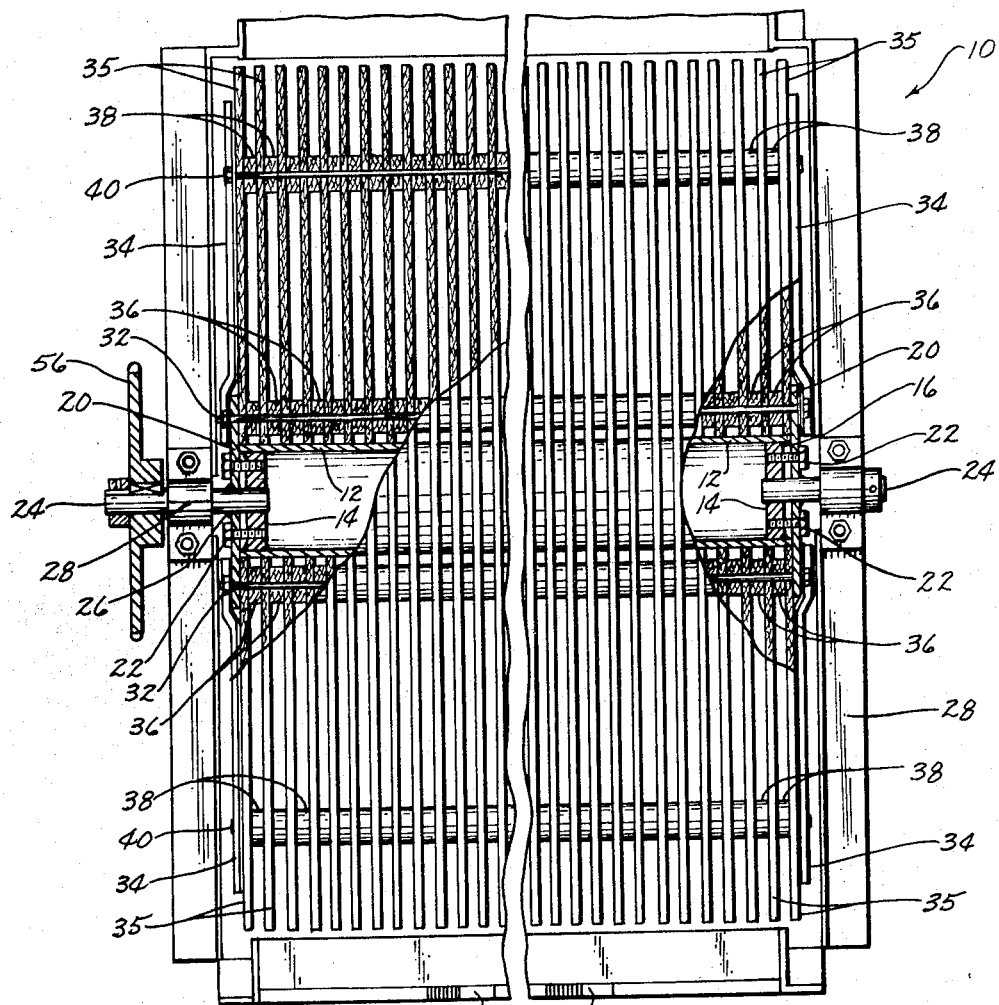
FIG. 3 is a fragmentary enlarged top plan view of one rotary disc unit illustrating specifically the details thereof.

The rotating disc units of this invention are referred to generally in FIG. 1 by the reference numeral 10. Each rotating disc unit 10 as seen in FIG. 3 includes a center axial sleeve shaft 12 with oppositely disposed end plugs 14 secured to the inner peripheral wall surface of the sleeve 12 by weldments 16. It is noted that the end plugs 14 are slightly inwardly offset from the outer ends of the sleeve 12.

An end plate 20 is provided at each end of the sleeve shaft 12 and is threadably secured to the end plugs 14 by a pair of threaded bolts 22. Stub shafts 24 are rigidly secured to the end plates 20 by weldments 26. A pair of pillow block bearings 28 are provided at each end of the sleeve for engagement with the stub shafts 24 and are supported by side flanges 28 provided on semicylindrical tanks 30 as seen in FIG. 2.

It is seen that as the bolts 22 are tightened the end plates 20 bear solely against the peripheral end edges of the sleeve 12 since the end plugs 14 are inwardly axially offset from the ends of sleeve 12.

Figure 2:
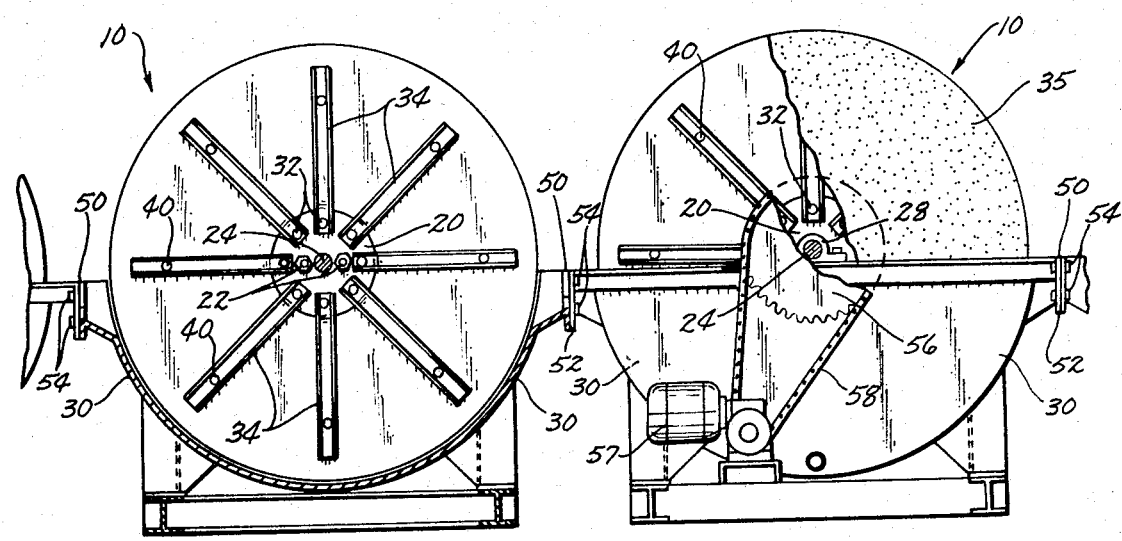
FIG. 2 is an enlarged side elevational view thereof taken along line 2—2 in FIG. 1.

As seen in FIGS. 2 and 3 a plurality of radially extending channel-shaped members 34 are connected to the end plates 20 by bolts 32 extending the full length of the unit 10. On the inner sides of the end plates 20 are Styrofoam disc members 35 which are spaced apart by inner and outer expanded plastic spacer rings 36 and 38 respectively. A series of unit length bolts 40 extend through the outer ends of the channel members 34, the spacer rings 38 and the discs 35 to secure the components together as a package unit.

The discs 35 are molded low density expanded plastic such as Polystyrene material having a buoyancy of 60 lb. per cu. ft. which will counterbalance the weight of the unit including the liquid waste material carried thereon during operation to the extend that minimum power requirements will be required for turning the discs in the tank 30. It has been found that Styrofoam expandable polystyrene is very suitable for the molding of the discs and the spacer rings. The spacers may be one-half inch thick while the discs may be three-quarters inch in thickness to give a cumulative unit width of approximately 5 feet. The Styrofoam discs 35 may have a 47-inch diameter.

As further seen in FIGS. 1 and 2 a plurality of the units 10 may be interconnected together and the liquid waste material will move from one to the next in a controlled fashion by flowing through weirs 50. The tanks 30 may be provided with flanges 52 secured together by bolts 54.

The units 10 are driven through sprocket shafts 56 carried on the stub shafts 24 by a common power source such as a motor 57 as seen in FIG. 1 coupled to the sprockets 56 by chain drives 58.

Figure 4:
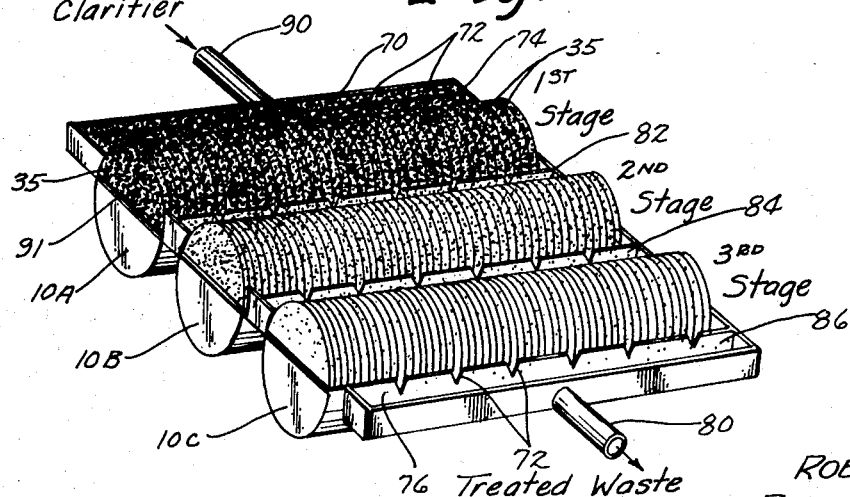
FIG. 4 is a perspective view of the biological reactor.

As seen in FIG. 4 three elongated units are placed in series to provide a biological reactor which receives waste material from a primary clarifier into a trough 70 which then feeds the liquid through the V-shaped openings 72 in the weir 74. The liquid waste material progresses from the first unit 10A to the next unit 10B through the final unit 10C where it is finally received in an outlet trough 76 in communication with an outlet pipe 80 connected to a secondary clarifier. A weir 82 is provided between the units 10A and 10B while a weir 84 is provided between the units 10B and 10C. A final stage weir 86 is provided between the unit 10C and the outlet trough 76.

Thus in operation it is seen that the liquid waste material is fed in through the inlet conduit 90 (FIG. 4) through the trough 70 and the weirs 74 including the V-shaped notches 72 into the tank 10A. The disc unit in the tank 10A rotates slowly and alternately dips the disc surfaces into the waste material and then into the air. The waste material 91 collects on the surfaces of the discs as they are rotated and this is facilitated by the contoured tank bottoms which have a corresponding semicylindrical shape to the discs 35. The waste material 90 turns into a biomass on the disc surface including colonies of bacteria which continue to propogate in the presence of adequate oxygen and this growth is uniform over the entire disc surface. The biomass on the discs oxidizes the waste material into metabolic byproducts and excess cell material. The treated water containing the solids is directed to a secondary clarifier for separation through the outlet conduit 80.

I claim:

1. A rotary disc waste treatment unit comprising,
an axial sleeve shaft having oppositely disposed end plugs rigidly secured to the inside wall of said sleeve,
an end plate at opposite ends of said sleeve shaft secured thereto by threaded bolts received in threaded openings formed in said end plugs,
a stub shaft extending outwardly through axially aligned openings formed in each of said end plates and end plugs,
means rigidly securing said stub shafts to said end plates,
said end plates having a peripheral flange disposed outwardly of said sleeve shaft, said flange having a plurality of openings formed therein adjacent the periphery thereof,
a plurality of discs and spacers alternately disposed on said sleeve shaft between said end plates,
a plurality of channel-shaped members radially disposed on said end plates and bolt means extending through said channel members, end plates, discs and spacers to provide an integral rotary disc unit, and
power means connected to one of said stub shafts for rotating said unit.

2. The structure of claim 1 wherein bolt means extend through the outer ends of said channel members and said discs adjacent the outer peripheral edges thereof, and spacers disposed between adjacent discs.

3. The structure of claim 2 wherein said discs are formed of expandable polystyrene material.

4. The structure of claim 3 wherein said expandable polystyrene material has substantial buoyancy and said disc unit is disposed in a tank a adapted to receive liquid waste material whereby the substantial weight of said disc unit is offset by the buoyancy of said discs.

5. The structure of claim 4 wherein said expandable polystyrene material has a buoyancy of 60 lb. per cu. ft.

6. The structure of claim 4 wherein said end plugs are inwardly offset from the opposite ends of said sleeve thereby being in spaced relationship to said end plates bearing directly against the peripheral end edges of said sleeve.

7. The structure of claim 4 wherein said rotary disc unit in said tank is one of a series of similar units disposed in series whereby liquid waste is fed from one unit to the next unit, each unit having an inlet and outlet side.

8. The structure of claim 7 wherein said tanks are semicylindrical in shape and conform substantially to the shape of said disc unit to substantially enclose the bottom half of said rotary disc unit and expose to the atmosphere the other half thereof.

9. The structure of claim 8 wherein said spacers include inner and outer spacers each of which are ring-shaped and embrace said sleeve shaft and are engaged by said bolt means, and said ring inner and outer spacers are formed from expandable polystyrene.

10. The structure of claim 8 wherein said semicylindrical tanks are interconnected and weir means is provided between each to control the flow of liquid waste material from one tank to the next tank, and the first tank having an inlet pipe connected thereto through which liquid waste is adapted to be fed into said first tank and the last tank having an outlet pipe connected thereto for discharge of said liquid waste.

* * * * *